(12) United States Patent
Liu

(10) Patent No.: US 10,392,843 B2
(45) Date of Patent: Aug. 27, 2019

(54) HINGE MODULE AND ASSEMBLING METHOD

(71) Applicant: Wistron Corporation, New Taipei (TW)

(72) Inventor: Yu-Ju Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 12 days.

(21) Appl. No.: 15/469,600

(22) Filed: Mar. 27, 2017

(65) Prior Publication Data

US 2018/0119467 A1    May 3, 2018

(30) Foreign Application Priority Data

Nov. 3, 2016  (TW) .............................. 105135773 A

(51) Int. Cl.
  *E05D 7/00*  (2006.01)
  *E05D 11/00*  (2006.01)
  (Continued)

(52) U.S. Cl.
  CPC ............ *E05D 11/0081* (2013.01); *E05D 3/02* (2013.01); *E05D 11/06* (2013.01); *G06F 1/1632* (2013.01);
  (Continued)

(58) Field of Classification Search
  CPC ....... Y10T 16/541–547; Y10T 16/5443; Y10T 16/5445; Y10T 16/5448; Y10T 16/54038;
  (Continued)

(56) References Cited

U.S. PATENT DOCUMENTS 6,925,684 B2 * 8/2005 Kang .................... G06F 1/1616
  16/264
7,140,071 B2 * 11/2006 Tonogai .............. H04M 1/0216
  16/325
(Continued)

FOREIGN PATENT DOCUMENTS

CN  200978878  11/2007
CN  102052389  5/2011
(Continued)

OTHER PUBLICATIONS

"Office Action of Taiwan Counterpart Application," dated Jun. 26, 2018, p. 1-p. 5.
(Continued)

*Primary Examiner* — Chuck Y Mah
(74) *Attorney, Agent, or Firm* — JCIPRNET

(57) ABSTRACT

A hinge module includes a first motion component, a second motion component, a third motion component, a linking component and an axle set. The second motion component has a push portion. The axle set includes a first axle, a second axle and a transmission assembly. The first axle and the second axle are coaxial and respectively connected to the linking component and the third motion component. The transmission assembly is connected between the first axle and the second axle. The first motion component and the second motion component are pivoted to the axle set. When the second motion component rotates with a first angular velocity, the second motion component props against the linking component by the push portion, such that the linking component drives the third motion component to rotate with a second angular velocity by the axle set.

31 Claims, 13 Drawing Sheets

(51) Int. Cl.
*E05D 3/02* (2006.01)
*E05D 11/06* (2006.01)
*G06F 1/16* (2006.01)

(52) U.S. Cl.
CPC ...... *G06F 1/1681* (2013.01); *E05Y 2900/606* (2013.01)

(58) Field of Classification Search
CPC .... E05D 3/02; E05D 3/04; E05D 3/18; E05D 3/122; E05D 3/12; E05D 3/16; E05D 3/06; E05D 3/32; E05D 11/06; E05D 11/0081; E05D 11/1021; E05D 11/1078; E05D 11/082; E05D 15/28; E05D 15/30; E05D 15/32; E05D 15/40; E05D 1/04; E05D 2001/045; E05Y 2900/606; G06F 1/16; G06F 1/1616; G06F 1/1681; G06F 1/166; G06F 1/1679; H04M 1/022; H04M 1/0241; H04M 1/0216; H04M 1/0222; H05K 5/0086; H05K 5/0226; F16M 11/10

See application file for complete search history.

(56) References Cited

U.S. PATENT DOCUMENTS

| | | | | |
|---|---|---|---|---|
| 7,216,401 B2 * | 5/2007 | Bae | ...... | G06F 1/1601 16/262 |
| 8,578,561 B2 * | 11/2013 | Chuang | ...... | G06F 1/1681 16/354 |
| 8,713,757 B2 * | 5/2014 | Chen | ...... | G06F 1/1616 16/327 |
| 9,524,000 B2 * | 12/2016 | Hsu | ...... | G06F 1/1681 |
| 9,617,770 B1 * | 4/2017 | Lin | ...... | E05D 11/082 |
| 9,677,308 B1 * | 6/2017 | Chen | ...... | E05D 3/18 |
| 9,785,199 B2 * | 10/2017 | Kamphuis | ...... | G06F 1/1681 |
| 2004/0107537 A1 * | 6/2004 | Ahn | ...... | H04M 1/0216 16/221 |
| 2009/0070961 A1 * | 3/2009 | Chung | ...... | E05D 3/122 16/354 |
| 2010/0299879 A1 * | 12/2010 | Yang | ...... | E05D 3/04 16/387 |
| 2011/0023272 A1 * | 2/2011 | Huang | ...... | E05D 3/18 16/362 |
| 2012/0096678 A1 * | 4/2012 | Zhang | ...... | G06F 1/1681 16/302 |
| 2012/0175478 A1 * | 7/2012 | Chen | ...... | G06F 1/1624 248/286.1 |
| 2012/0217855 A1 * | 8/2012 | Chen | ...... | G06F 1/1616 312/323 |
| 2013/0091666 A1 * | 4/2013 | Carmonius | ...... | H04M 1/022 16/328 |
| 2015/0345195 A1 * | 12/2015 | Park | ...... | F16C 11/10 16/354 |
| 2017/0275935 A1 * | 9/2017 | Shang | ...... | G06F 1/1681 |
| 2017/0308130 A1 * | 10/2017 | Hsu | ...... | G06F 1/1616 |
| 2018/0024596 A1 * | 1/2018 | Park | ...... | E05D 3/122 361/679.55 |
| 2018/0073613 A1 * | 3/2018 | Chen | ...... | F16H 25/08 |

FOREIGN PATENT DOCUMENTS

| | | |
|---|---|---|
| CN | 102819289 | 12/2012 |
| TW | M478992 | 5/2014 |
| TW | M503597 | 6/2015 |
| TW | M521281 | 5/2016 |

OTHER PUBLICATIONS

"Office Action of Taiwan Counterpart Application," dated Jan. 9, 2018, p. 1-p. 28, in which the listed references were cited.

* cited by examiner

HINGE MODULE AND ASSEMBLING METHOD

CROSS-REFERENCE TO RELATED APPLICATION

This application claims the priority benefit of Taiwan application serial no. 105135773, filed on Nov. 3, 2016. The entirety of the above-mentioned patent application is hereby incorporated by reference herein and made a part of this specification.

BACKGROUND OF THE INVENTION

Field of the Invention

The disclosure relates to a hinge module and an assembling method, more specifically relates to a hinge module having an axle set with a single axis and an assembling method of several components thereof.

Description of Related Art

Tablet computers (tablet PCs) have been gradually popularized in consumer market because of their advantages, such as light weight and portable. In order to allow the user to enter inputs into the tablet PC via a physical keyboard, the tablet PC can be inserted into a docking station having a keyboard module so as become similar to a notebook computer.

In general, the weight of the tablet PC is greater than the weight of the docking station, which leads to instability of the whole structure caused by position of the center of gravity. Although increasing the weight the of the docking station can solve the instability problem caused by position of the center of gravity, the tablet PC and its docking station lose an advantage of light weight. In addition, some docking stations are designed to have a supporting structure that is configured to solve the instability problem caused by position of the center of gravity. However, in general, the supporting structure of the docking station can only support the tablet PC at a specific tilt angle, so the user cannot adjust the tilt angle of the tablet PC to any angle according to requirement. Furthermore, some tablet PCs are designed to have a foot stand for supporting themselves, which is configured to solve the instability problem caused by position of the center of gravity. However, the supporting area of this foot stand in the tablet PC is generally small, the tablet PC easily causes discomfort when being placed on the thigh of the user, and the tilt angle of the tablet PC is limited because the foot stand is located at the back of the tablet PC.

SUMMARY OF THE DISCLOSURE

The disclosure provides a hinge module capable of freely adjusting a tilt angle of an electronic device, and preventing discomfort caused when a foot stand of the electronic device is placed on the thigh of the user.

The hinge module of the disclosure includes a first motion component, a second motion component, a third motion component, a linking assembly, and an axle set. The second motion component is connected between the first motion component and the third motion component and has a push portion. The linking assembly includes a linking component. The axle set includes a first axle, a second axle and a transmission assembly. The first axle and the second axle are coaxial and respectively connected to the linking component and the third motion component. The transmission assembly is connected between the first axle and the second axle. The first motion component and the second motion component are pivoted to the axle set. When the second motion component rotates relative to the first motion component with a first angular velocity from a first operation state toward a second operation state so as to increase an included angle between the first motion component and the second motion component, the second motion component props against the linking component by the push portion, such that the linking component drives the third motion component to synchronously rotate relative to the first motion component with a second angular velocity by the axle set.

In one embodiment of the disclosure, the first motion component has a first stop portion, when the second motion component rotates to the second operation state, the first stop portion blocks the linking component to stop the linking component from continuing to rotate.

In one embodiment of the disclosure, the linking assembly includes an elastic member, the elastic member is connected between the linking component and the axle set, when the second motion component continues to rotate relative to the first motion component from the second operation state, the second motion component resists elastic force of the elastic member and pushes the linking component to move along the axle set by the push portion, and the second motion component rotates toward a third operation state.

In one embodiment of the disclosure, when the second motion component is in the first operation state, the included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component is the second angle, the included angle between the first motion component and third motion component is the third angle.

In one embodiment of the disclosure, the linking component has a slot, the axle set has a column body, the column body passes through the slot, and the axle set is driven by the linking component through the column body.

In one embodiment of the disclosure, the linking component is slidably disposed on the axle set along an axial direction of the axle set, and the column body is adapted to move in the slot along the axial direction of the axle set.

In one embodiment of the disclosure, the transmission assembly is a planetary gear set comprising an internal gear, a planetary carrier, and a plurality of planetary gears, the internal gear is connected with the first motion component, the planetary carrier is connected with the first axle, the plurality of planetary gears are connected with the planetary carrier and engaged between the internal gear and the second axle.

In one embodiment of the disclosure, the linking component has an oblique surface, when the second motion component rotates relative to the first motion component from the first operation state to the second operation state, the second motion component props against the oblique surface of the linking component by the push portion, and when the second motion component continues to rotate relative to the first motion component from the second operation state, the push portion moves along the oblique surface.

In one embodiment of the disclosure, a tilt angle of the oblique surface with respect to an axial direction of the axle set is 45 degrees.

In one embodiment of the disclosure, the second axle is inserted into the first axle.

In one embodiment of the disclosure, the linking component has a second stop portion, when the second motion component rotates relative to the first motion component to a third operation state, the push portion leans against the second stop portion to stop the second motion component from continuing to rotate relative to the first motion component.

The hinge module of the disclosure includes a first motion component, a second motion component, a third motion component, a linking assembly, and an axle set. The second motion component is connected between the first motion component and the third motion component and has a pull portion. The linking assembly includes a linking component. The axle set includes a first axle, a second axle and a transmission assembly. The first axle and the second axle are coaxial and respectively connected to the linking component and the third motion component. The transmission assembly is connected between the first axle and the second axle. The first motion component and the second motion component are pivoted to the axle set. When the second motion component rotates relative to the first motion component with a first angular velocity from a second operation state toward a first operation state so as to decrease an included angle between the first motion component and the second motion component, the second motion component props against the linking component by the pull portion, so as to drive the third motion component to synchronously rotate relative to the first motion component with a second angular velocity by the linking component.

In one embodiment of the disclosure, the second motion component is adapted to rotate relative to the first motion component from a third operation state toward the second operation state, so that the pull portion is in contact with the linking component.

In one embodiment of the disclosure, when the second motion component is in the first operation state, the included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component is the second angle, the included angle between the first motion component and third motion component is the third angle.

In one embodiment of the disclosure, the linking component has a slot, the axle set has a column body, the column body passes through the slot, and the axle set is driven by the linking component through the column body.

In one embodiment of the disclosure, the transmission assembly is a planetary gear set comprising an internal gear, a planetary carrier, and a plurality of planetary gears, the internal gear is connected with the first motion component, the planetary carrier is connected with the first axle, the plurality of planetary gears are connected with the planetary carrier and engaged between the internal gear and the second axle.

In one embodiment of the disclosure, the second axle is inserted into the first axle.

The hinge module of the disclosure includes a first motion component, a second motion component, a third motion component, a linking assembly, and an axle set. The second motion component is connected between the first motion component and the third motion component and has a push portion and a pull portion. The linking assembly includes a linking component. The axle set includes a first axle, a second axle and a transmission assembly. The first axle and the second axle are coaxial and respectively connected to the linking component and the third motion component. The transmission assembly is connected between the first axle and the second axle. The first motion component and the second motion component are pivoted to the axle set. When the second motion component rotates relative to the first motion component with a first angular velocity from a first operation state toward a second operation state so as to increase an included angle between the first motion component and the second motion component, the second motion component props against the linking component by the push portion, such that the linking component drives the third motion component to synchronously rotate relative to the first motion component with a second angular velocity by the axle set. When the second motion component rotates relative to the first motion component with the first angular velocity from the second operation state toward the first operation state so as to decrease the included angle between the first motion component and the second motion component, the second motion component props against the linking component by the pull portion, so as to drive the third motion component to synchronously rotate relative to the first motion component with the second angular velocity by the linking component.

In one embodiment of the disclosure, the first motion component has a first stop portion, when the second motion component rotates to the second operation state, the first stop portion blocks the linking component to stop the linking component from continuing to rotate.

In one embodiment of the disclosure, the linking assembly includes an elastic member, the elastic member is connected between the linking component and the axle set, when the second motion component continues to rotate relative to the first motion component from the second operation state, the second motion component resists elastic force of the elastic member and pushes the linking component to move along the axle set by the push portion, and the second motion component rotates toward a third operation state, wherein the second motion component is adapted to rotate relative to the first motion component from the third operation state and toward the second operation state, so that the pull portion is in contact with the linking component.

In one embodiment of the disclosure, when the second motion component is in the first operation state, the included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component is the second angle, the included angle between the first motion component and third motion component is the third angle.

In one embodiment of the disclosure, the linking component has a slot, the axle set has a column body, the column body passes through the slot, and the axle set is driven by the linking component through the column body.

In one embodiment of the disclosure, the linking component is slidably disposed on the axle set along an axial direction of the axle set, and the column body is adapted to move in the slot along the axial direction of the axle set.

In one embodiment of the disclosure, the transmission assembly is a planetary gear set comprising an internal gear, a planetary carrier, and a plurality of planetary gears, the internal gear is connected with the first motion component, the planetary carrier is connected with the first axle, the plurality of planetary gears are connected with the planetary carrier and engaged between the internal gear and the second axle.

In one embodiment of the disclosure, the linking component has an oblique surface, when the second motion component rotates relative to the first motion component from the first operation state to the second operation state, the second motion component props against the oblique surface of the linking component by the push portion, and when the second motion component continues to rotate relative to the first motion component from the second operation state, the push portion moves along the oblique surface.

In one embodiment of the disclosure, a tilt angle of the oblique surface with respect to an axial direction of the axle set is 45 degrees.

In one embodiment of the disclosure, the second axle is inserted into the first axle.

In one embodiment of the disclosure, the linking component has a second stop portion, when the second motion component rotates relative to the first motion component to a third operation state, the push portion leans against the second stop portion to stop the second motion component from continuing to rotate relative to the first motion component.

An assembling method of the disclosure includes following steps. An axle set is passed through a linking component, wherein the linking component has a slot. A column body is attached on the axle set through the slot, so that the column body is located in the slot.

In one embodiment of the disclosure, the axle set includes a first axle and a second axle, the second axle is inserted into the first axle, and the step of attaching the column body to the axle set includes: attaching the column body to the first axle.

Based on the above, with respect to the hinge module of the present embodiment, in process of increasing the included angle between the first motion component (connected to a docking station, for example) and the second motion component (connected to an electronic device, for example) from the first angle to the second angle, the second motion component props against the linking component by the push portion, such that the third motion component (connected to the foot stand, for example) is driven to rotate relative to the first motion component so as to flip over. Hence, the foot stand connected to the third motion component supports the docking station and the electronic device. When the included angle between the first motion component and the second motion component reaches the second angle, the linking component is stopped by the first stop portion of the first motion component, so the third motion component is not driven by the second motion component. At this time, the second motion component can continue to flip over relative to the first motion component so that the included angle between the first motion component and the second motion component continues increasing. Accordingly, the tilt angle of the second motion component and the electronic device connected to the same can be freely and independently adjusted between the second angle and the third angle and is not limited by the third motion component and the foot stand connected to the same.

In order to make the aforementioned and other features and advantages of the disclosure more comprehensible, embodiments accompanying figures are described in details below.

DESCRIPTION OF THE EMBODIMENTS

Figure 1:
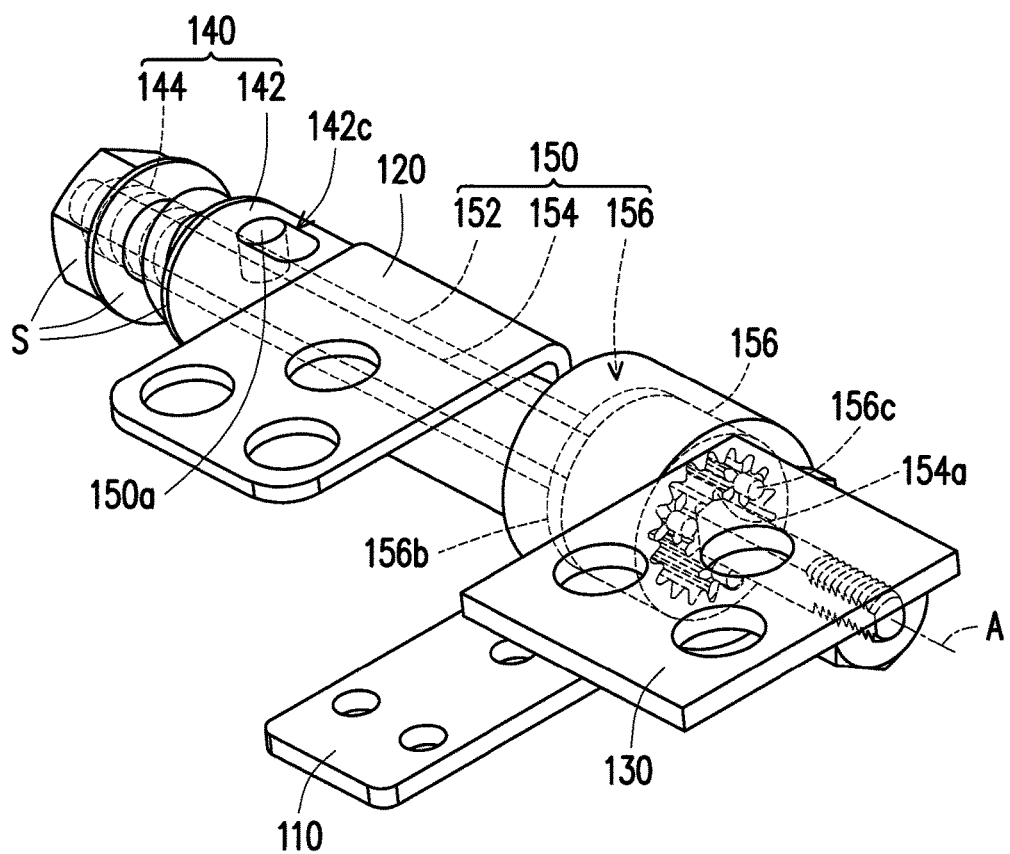
FIG. 1 is a three dimensional view of a hinge module according to an embodiment of the disclosure.
Figure 2:
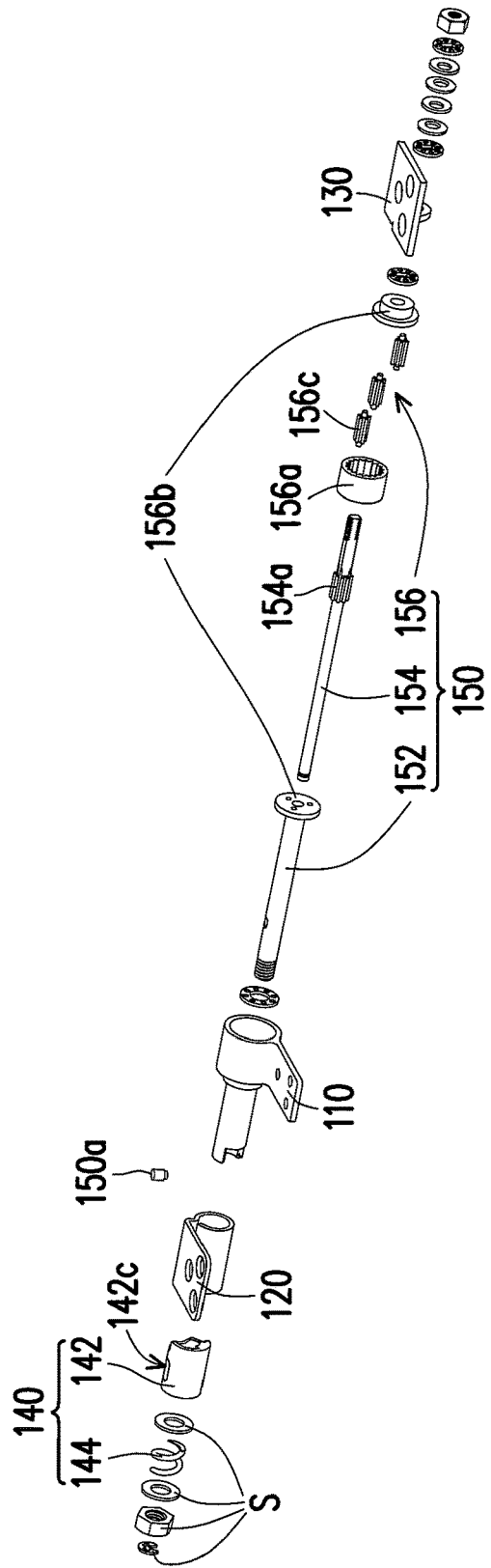
FIG. 2 is an exploded view of the hinge module in FIG. 1.

FIG. 1 is a three dimensional view of a hinge module according to an embodiment of the disclosure. FIG. 2 is an exploded view of the hinge module in FIG. 1. Referring to FIGS. 1-2, the hinge module 100 of the present embodiment includes a first motion component 110, a second motion component 120, a third motion component 130, a linking assembly 140, and an axle set 150. The second motion component 120 is connected between the first motion component 110 and the third motion component 130 through the linking assembly 140 and the axle set 150. In the present embodiment, the first motion component 110, the second motion component 120, and the third motion component 130 all belong to a frame and are configured to respectively connect with a docking station, an electronic device, and a foot stand, for example.

To be more specific, the linking assembly 140 includes a linking component 142 and an elastic member 144, the elastic member 144 is, for example, a compressed spring and is connected between the linking component 142 and the axle set 150, wherein the elastic member 144 is compressed between the linking component 142 and a stop member S (such as a screw nut, a gasket, etc.) on the axle set 150, for example. The axle set 150 includes a first axle 152, a second axle 154, and a transmission assembly 156, and the second axle 154 is inserted into the first axle 152 so that the first axle 152 and the second axle 154 are coaxial. The first axle 152 and the second axle 154 are respectively connected to the linking component 142 and the third motion component 130. The transmission assembly 156 is connected between the first axle 152 and the second axle 154. The axle set 150 passes through the first motion component 110 and the second motion component 120, such that the first motion component 110 and the second motion component 120 are pivoted to the axle set 150.

Figure 3:
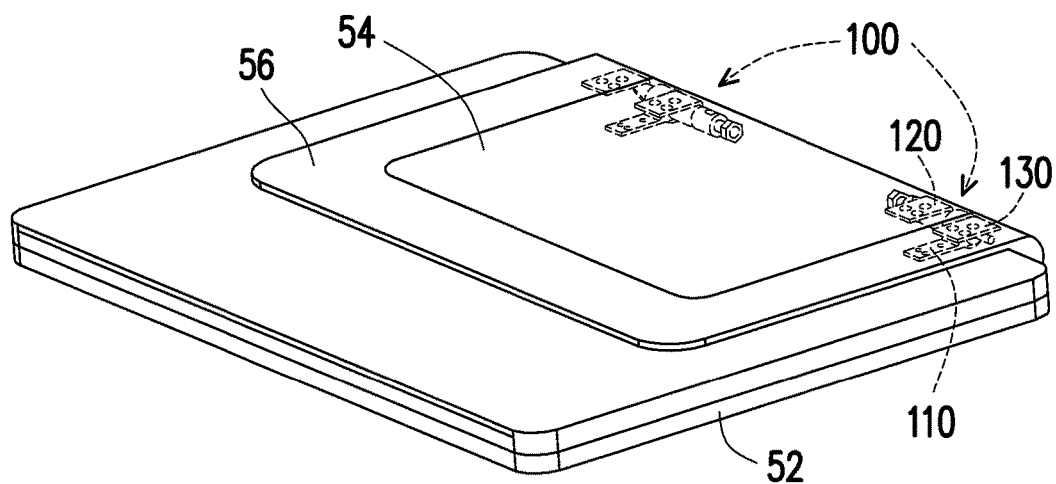
FIG. 3 is a schematic view depicting the hinge module in FIG. 1 being installed in a docking station.

FIG. 3 is a schematic view depicting the hinge module in FIG. 1 being installed in a docking station. The hinge module 100 of the present embodiment may be installed in a docking station 52 as shown in FIG. 3, wherein the first motion component 110 is connected to the docking station 52, the second motion component 120 is connected to a support plate 54, and the third motion component 130 is connected to a foot stand 56. The support plate 54 is configured so that an electronic device (such as a tablet PC) is supported thereon. The foot stand 56 is configured to support the docking station 52 and the electronic device.

Figure 4:
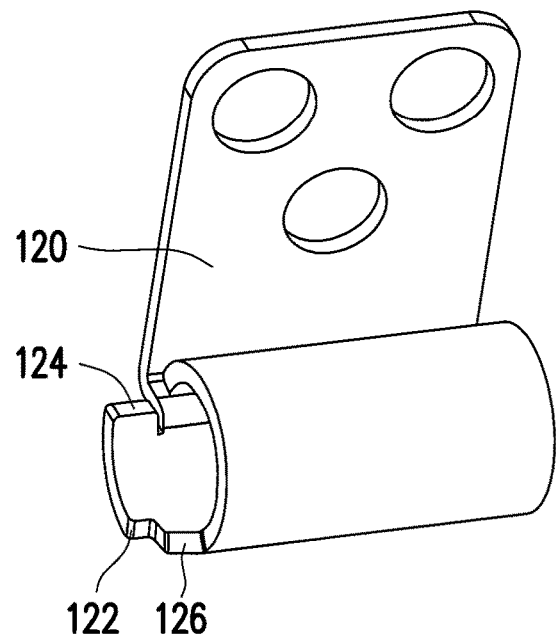
FIG. 4 is a three dimensional view of a second motion component in FIG. 1.
Figure 5:
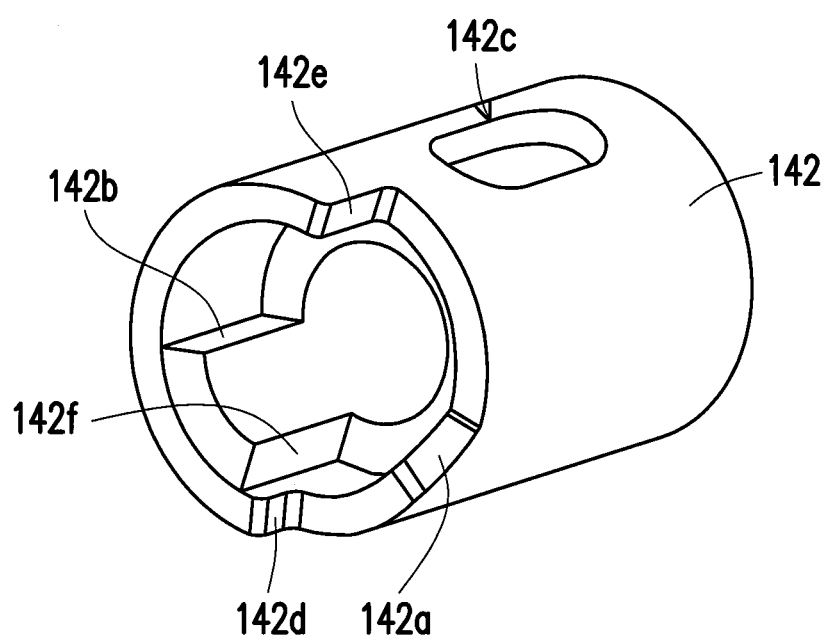
FIG. 5 is a three dimensional view of a linking component in FIG. 1.

FIG. 4 is a three dimensional view of the second motion component in FIG. 1. FIG. 5 is a three dimensional view of the linking component in FIG. 1. Referring to FIGS. 4-5, in the present embodiment, the second motion component 120 has a push portion 122, the linking component 142 has an oblique surface 142a, a tilt angle of the oblique surface 142a with respect to an axial direction A (indicated in FIG. 1) of the axle set 150 is 45 degrees as an example, the disclosure is not limited thereto. The second motion component 120 props against the oblique surface 142a of the linking component 142 by the push portion 122 and drives the third motion component 130 by the linking component 142 and the axle set 150. The detail will be described hereinafter with drawings.

Figure 6A:
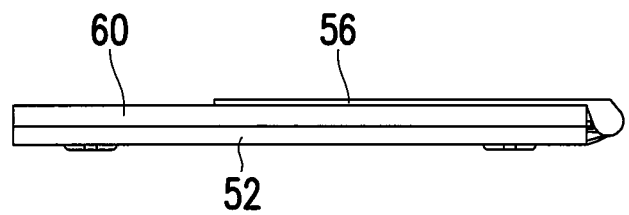
FIG. 6A to FIG. 6D are schematic views depicting actuation process of the docking station, a support plate, and a foot stand in FIG. 3.
Figure 6B:
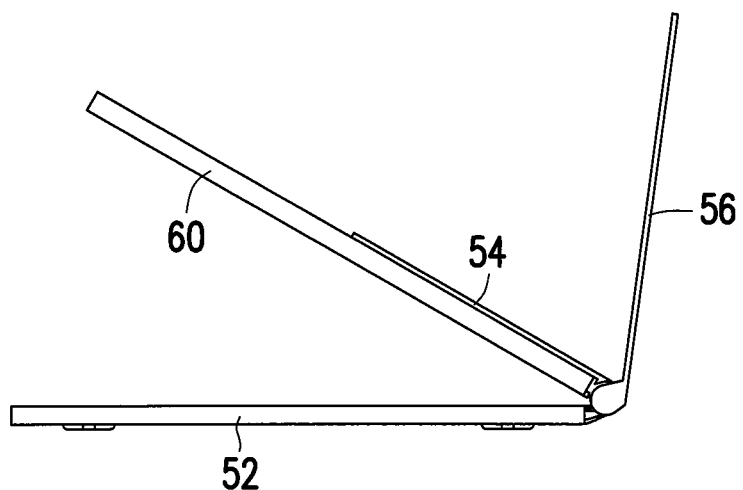
Figure 6C:
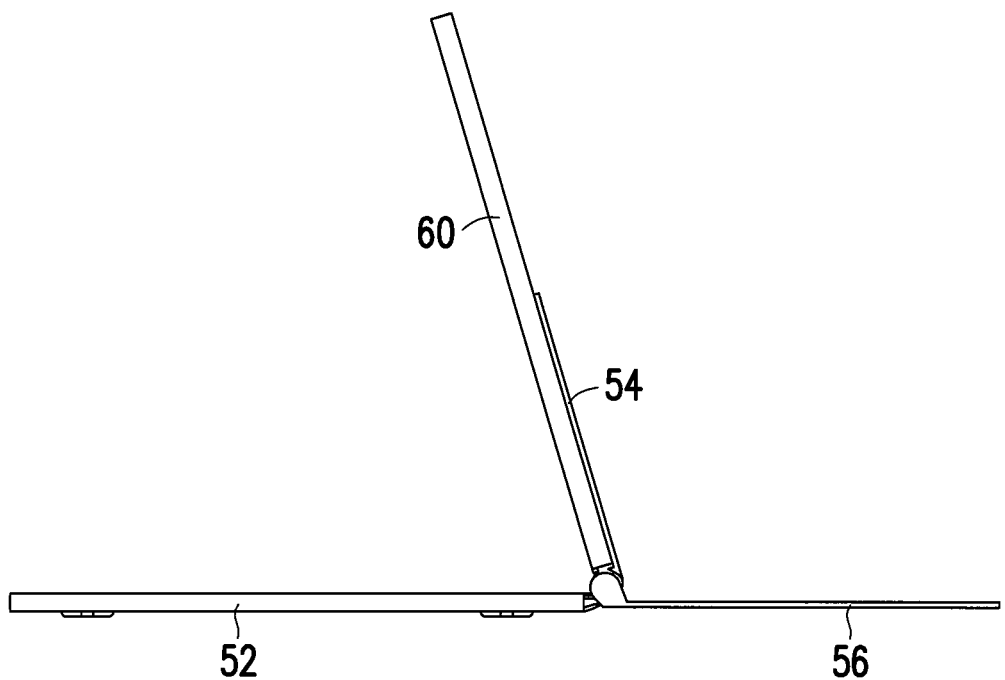
Figure 6D:
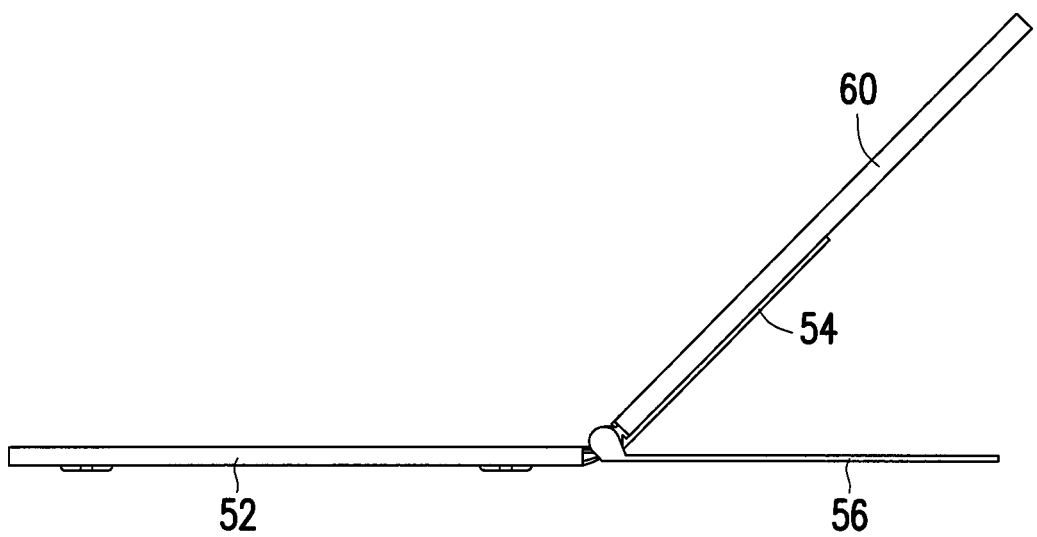
Figure 7A:
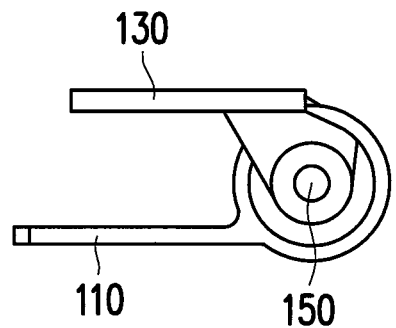
FIG. 7A to FIG. 7D are schematic side views depicting actuation process of the hinge module in FIG. 1.
Figure 7B:
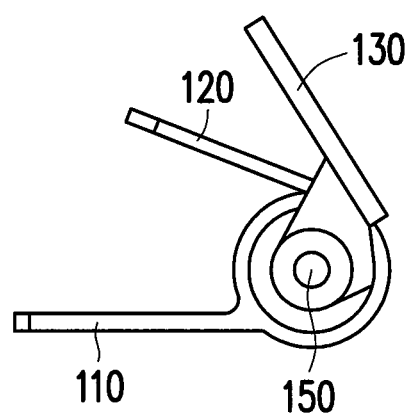
Figure 7C:
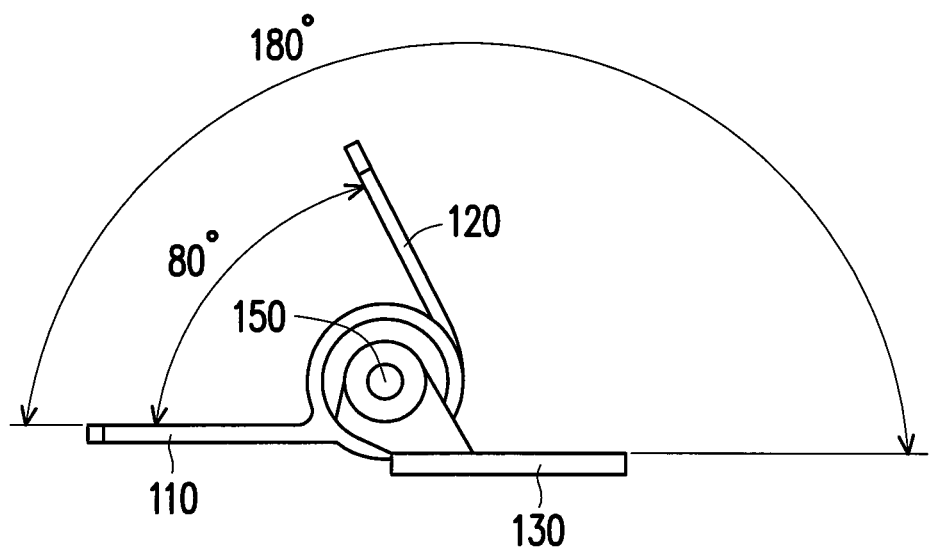
Figure 7D:
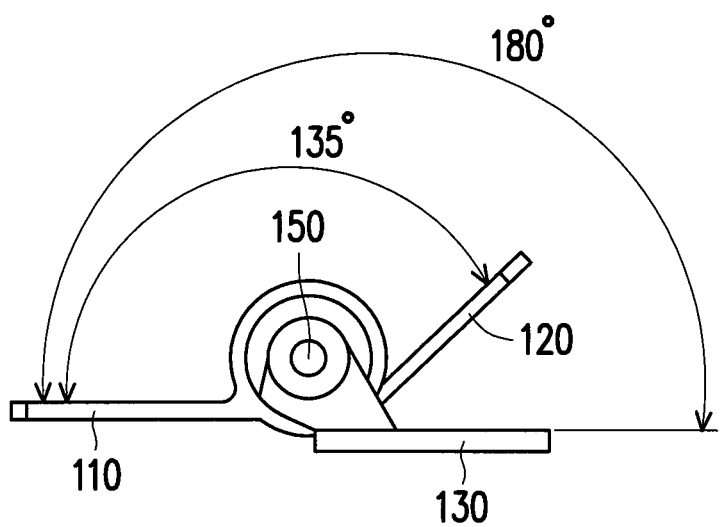
Figure 8A:
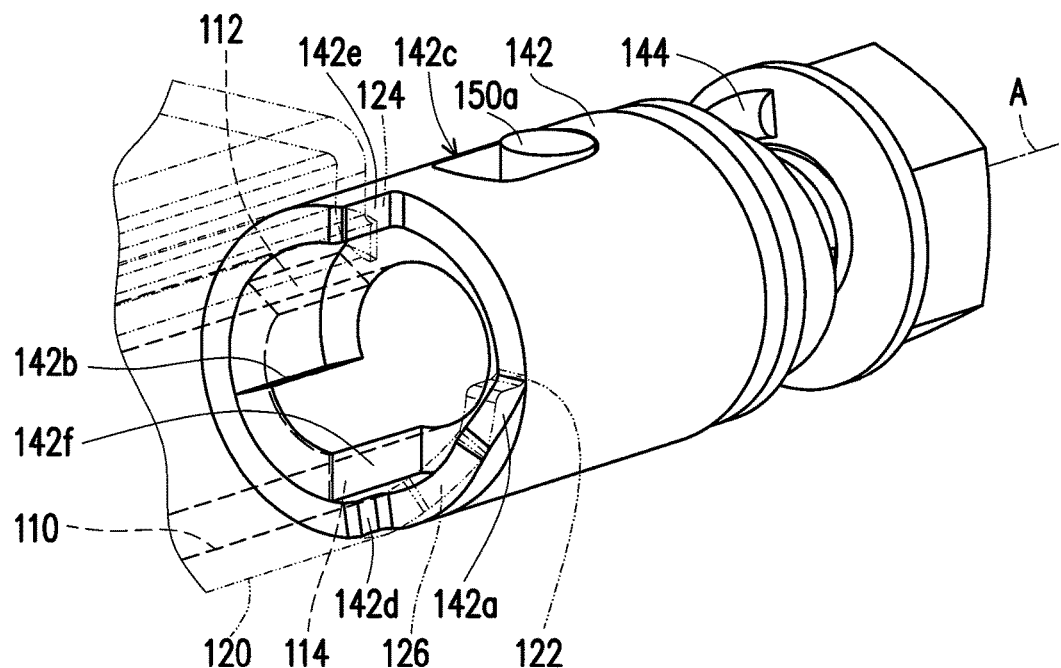
FIG. 8A to FIG. 8D are schematic views depicting actuation process of a part of the hinge module in FIG. 1.
Figure 8B:
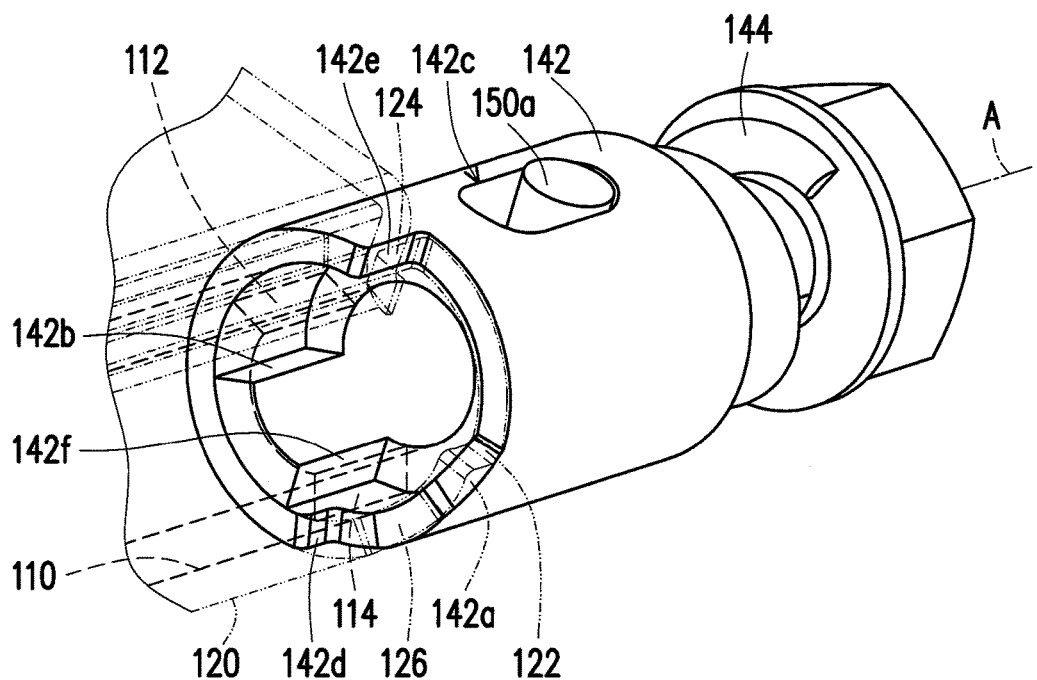
Figure 8C:
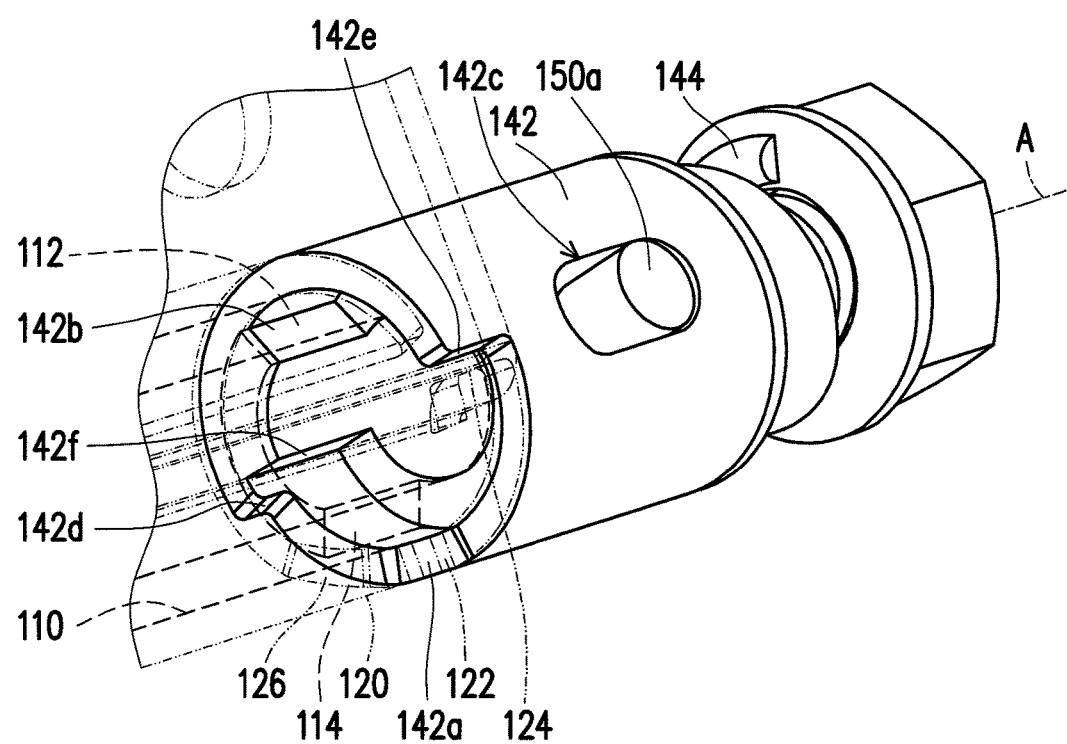

FIG. 6A to FIG. 6D are schematic views depicting actuation process of the docking station, the support plate, and the foot stand in FIG. 3. FIG. 7A to FIG. 7D are schematic side views depicting actuation process of the hinge module in FIG. 1. FIG. 8A to FIG. 8D are schematic views depicting actuation process of a part of the hinge module in FIG. 1. When the user flips over the electronic device 60 and the support plate 54 from the docking station 52 as shown in FIGS. 6A-6C, the second motion component 120 rotates relative to the first motion component 110 with a first angular velocity from a first operation state toward a second operation state so as to increase the included angle between the first motion component 110 and the second motion component 120 as shown in FIGS. 7A-7C, the second motion component 120 props against the oblique surface 142a of the linking component 142 by the push portion 122 as shown in FIGS. 8A-8C, such that the linking component 142 drives the third motion component 130 to synchronously rotate relative to the first motion component 110 with a second angular velocity, as shown in FIGS. 7A-7C, by the axle set 150 shown in FIGS. 1-2.

The second angular velocity is greater than the first angular velocity, so that the included angle between the first motion component 110 and the third motion component 130 is greater than the included angle between the first motion component 110 and the second motion component 120 as shown in FIG. 7C, and the included angle between the docking station 52 and the foot stand 56 is greater than the included angle between the docking station 52 and the support plate 54 as shown in FIG. 6C. In addition, in the actuation process depicted in FIG. 8A to FIG. 8C, the linking component 142 is pressed against the second motion component 120 by elastic force of the elastic member 144 (illustrated in FIGS. 1-2). Therefore, the push portion 122 of the second motion component 120 and the oblique surface of the linking component 142 do not produce relative displacement in this actuation process, and the second motion component 120 can firmly push the linking component 142 to rotate.

Figure 9:
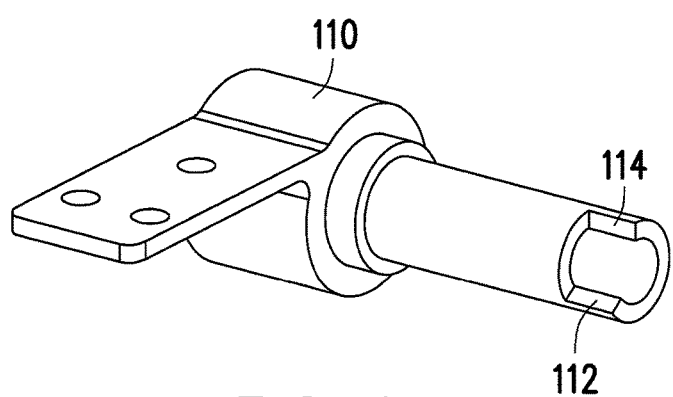
FIG. 9 is a three dimensional view of a first motion component in FIG. 1.

FIG. 9 is a three dimensional view of the first motion component in FIG. 1. The first motion component 110 shown in FIG. 1 has a first stop portion 112. In the aforementioned actuation process, when the second motion component 120 rotates to the second operation state shown in FIGS. 7C and 8C, the first stop portion 112 of the first motion component 110 blocks a stop structure 142b of the linking component 142 as shown in FIG. 8C, so as to stop the linking component 142 from continuing to rotate. When the user continues to flip over the electronic device 60 and the support plate 54 shown in FIG. 6C to a state shown in FIG. 6D, the second motion component 120 continues to rotate relative to the first motion component 110 from the second operation state. At this time, since the linking component 142 is limited and cannot continue to rotate as above-mentioned, the second motion component 120 resists elastic force of the elastic member 144 via force applied by the user and pushes the linking component 142 to move along the axial direction A of the axle set 150 by the push portion 122, and the second motion component 120 rotates toward a third operation state. In this process, the push portion 122 moves along the oblique surface 142a of the linking component 142, so that the second motion component 120 and the linking component 142 can be actuated relative to each other smoothly.

Figure 8D:
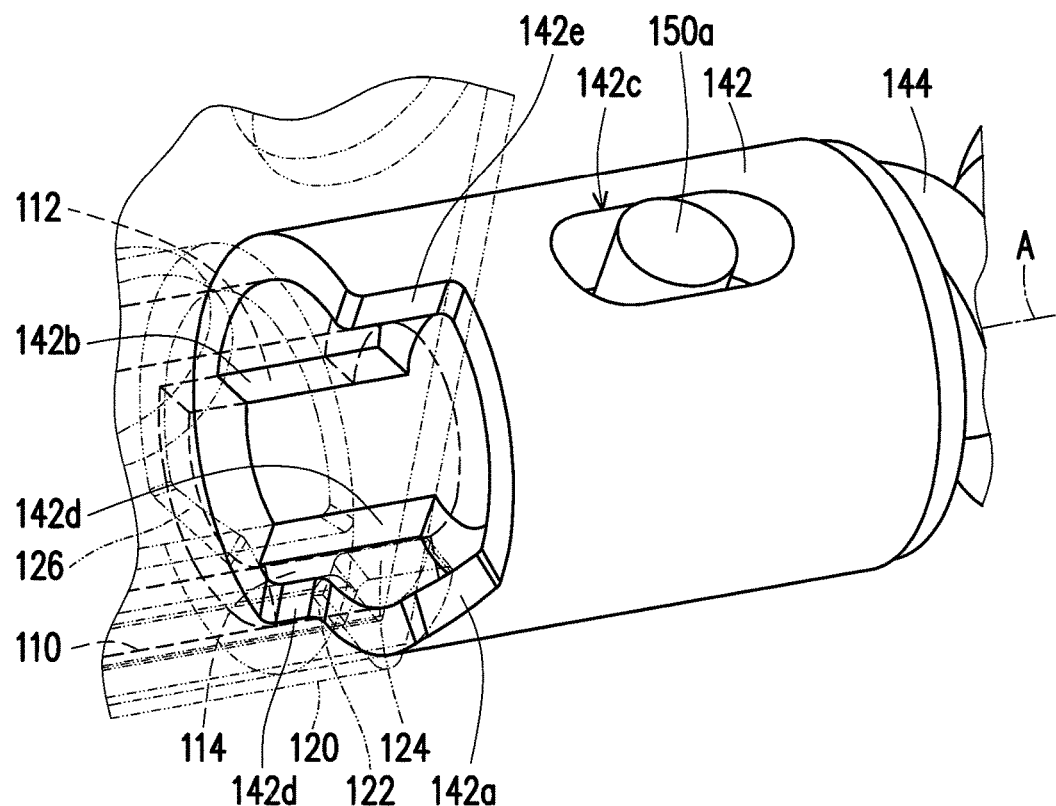

Referring to FIG. 5, the linking component 142 of the present embodiment has a second stop portion 142d. When the second motion component 120 rotates relative to the first motion component 110 to the third operation state as shown in FIG. 7D, the push portion 122 of the second motion component 120 leans against the second stop portion 142d of the linking component 142 to stop the second motion component 120 from continuing to rotate relative to the first motion component 110, so as to limit the maximum flipping angle of the electronic device 60 and the support plate 54 as a state shown in FIG. 6D. Wherein, after the push portion 122 of the second motion component 120 shown in FIG. 8C departs from the oblique surface 142a of the linking component 142 along with the relative rotation between the second motion component 120 and the linking component 142, the second motion component 120 is guided by a guiding surface 126 thereof to continue rotating relative to the linking component 142 until the push portion 122 of the second motion component 120 is in contact with the second stop portion 142d of the linking component 142 as shown in FIG. 8D.

In the present embodiment, when the second motion component 120 is in the first operation state, the included angle between the first motion component 110 and the second motion component 120 is, for example, a first angle, the included angle between the first motion component 110 and the third motion component 130 is, for instance, also the first angle, and the first angle is 0 degree as an example shown in FIG. 7A. When the second motion component 120 is in the second operation state, the included angle between the first motion component 110 and the second motion component 120 is, for example, a second angle, the included angle between the first motion component 110 and the third motion component 130 is, for instance, a third angle, and the second angle is 80 degrees as an example shown in FIG. 7C and the third angle is 180 degrees as an example shown in FIG. 7C. When the second motion component 120 is in the third operation state, the included angle between the first motion component 110 and the second motion component 120 is, for example, a fourth angle, the included angle between the first motion component 110 and the third motion component 130 is, for instance, the third angle, and the fourth angle is 135 degree as an example shown in FIG. 7D. However, the disclosure is not limited thereto, in the third operation state shown in FIG. 7C, the included angle between the first motion component 110 and the second motion component 120 may be the third angle.

Based on the above configuration and actuation process, in process of increasing the included angle between the first motion component 110 and the second motion component 120 from the first angle to the second angle, the second motion component 120 props against the linking component 142 by the push portion 122, such that the third motion component 130 is driven to rotate relative to the first motion component 110 so as to flip over. Hence, the foot stand 56 connected to the third motion component 130 supports the docking station 52 and the electronic device 60. When the included angle between the first motion component 110 and the second motion component 120 reaches the second angle, the linking component 142 is stopped by the first stop portion 112 of the first motion component 110, so the third motion component 130 is not driven by the second motion component 120. At this time, the second motion component 120 can continue to flip over relative to the first motion component 110 so that the included angle between the first motion component 110 and the second motion component 120 continues increasing. Accordingly, the tilt angle of the second motion component 120 and the electronic device 60 connected to the same can be freely and independently adjusted between the second angle and the third angle and is not limited by the third motion component 130 and the foot stand 56 connected to the same.

Referring to FIG. 1, in the present embodiment, the linking component 142 has a slot 142c, the axle set 150 has a column body 150a, the column body 150a passes through the slot 142c, and the axle set 150 is driven by the linking component 142 through the column body 150a. Moreover, the linking component 142 is slidably disposed on the axle set 150 along the axial direction A of the axle set 150, the slot 142c is extended along the axial direction A of the axle set 150, so the column body 150a is adapted to move in the slot 142c along the axial direction A of the axle set 150. Hence, the linking component 142 can smoothly move along the axial direction A in the actuation process from FIG. 8C to FIG. 8D, as above-mentioned.

The process of closing the electronic device 60 toward the docking station 52 is described as followings. Referring to FIG. 4, the second motion component 120 has a pull portion 124. When the second motion component 120 rotates from the third operation state shown in FIG. 8D toward the second operation state shown in FIG. 8C until the pull portion 124 of the second motion component 120 is in contact with the stop structure 142e of the linking component 142, the linking component 142 starts to be driven by the second motion component 120. Accordingly, when the second motion component 120 rotates relative to the first motion component with the first angular velocity from the second operation state toward the first operation state so as to decrease the included angle between the first motion component 110 and the second motion component 120, the pull portion 124 of the second motion component 120 props against the stop structure 142e of the linking component 142, so as to drive the third motion component 130 to synchronously rotate relative to the first motion component 110 with the second angular velocity to the first operation state shown in FIG. 6A, FIG. 7A, and FIG. 8A by the linking component 142.

Referring to FIG. 9, the first motion component 110 of the present embodiment has a third stop portion 114. When the third motion component 130 is driven by the linking component 142 to rotate to the first operation state shown in FIGS. 6A, 7A, and 8A as described above, the third stop portion 114 of the first motion component 110 blocks a stop structure 142f of the linking component 142 as shown in FIG. 8A, so as to stop the linking component 142 and the third motion component 130 from continuing to rotate.

The disposition of the axle set and the transmission assembly is described in detail hereinafter. Referring to FIGS. 1-2, in the present embodiment, the transmission assembly 156 is a planetary gear set including an internal gear 156a, a planetary carrier 156b, and a plurality of planetary gears 156c, the internal gear 156a has a ring shape and a gear structure is formed on the inner surface of the internal gear 156a, the internal gear 156a is connected with the first motion component 110, the planetary carrier 156b is connected with the first axle 152, the plurality of planetary gears 156c are connected with the planetary carrier 156b and engaged between the internal gear 156b and a gear portion 154a of the second axle 154. Wherein, the internal gear 156a connected with the first motion component 110 may be regarded as the fixed end, the planetary carrier 156b connected with the first axle 152 may be regarded as the driving end, and the second axle 154 may be regarded as the passive end and driven by the planetary carrier 156b through the plurality of planetary gears 156c. Because of this disposition and an appropriate gear ratio between the internal gear 156b and the planetary gear 156c, the first axle 152 drives the second axle 154 to rotate in the same direction with the first axle 152 at a higher speed. Therefore, the second angular velocity of the third motion component 130 is greater than the first angular velocity of the second motion component 120.

Figure 10:
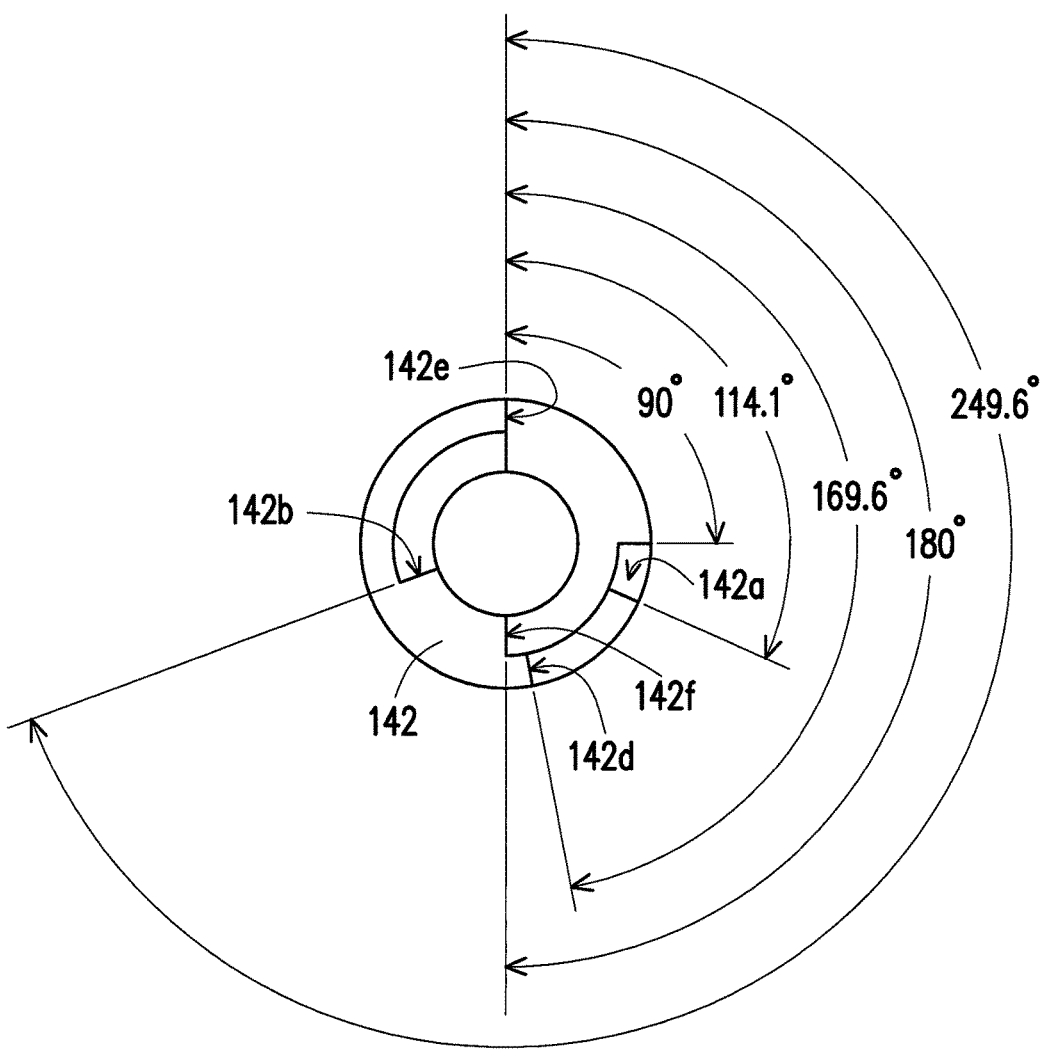
FIG. 10 is a side view of the linking component in FIG. 5.
Figures 11, 12:
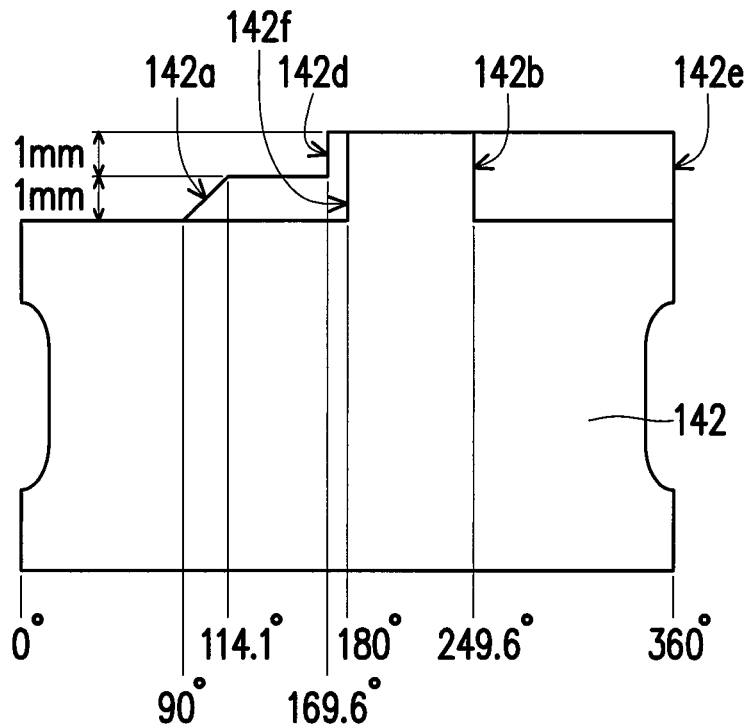
FIG. 11 is a developed view of the linking component in FIG. 5.
FIG. 12 is a flow chart of an assembling method of the axle set, the linking component, and the column body in FIG. 1.

The parameters of a possible design of the linking component are described as followings with drawings. FIG. 10 is a side view of the linking component in FIG. 5. FIG. 11 is a developed view of the linking component in FIG. 5. Referring to FIGS. 10-11, the extending angle between the stop structure 142e and one end of the oblique surface 142a of the linking component 142 is, for example, 90 degrees, the extending angle between the stop structure 142e and another end of the oblique surface 142a of the linking component 142 is, for example, 114.1 degrees, the extending angle between the stop structure 142e and the second stop portion 142d of the linking component 142 is, for example, 169.6 degrees, the extending angle between the stop structure 142e and the stop structure 142f of the linking component 142 is, for example, 180 degrees, and the extending angle between the stop structure 142e and the stop structure 142b of the linking component 142 is, for example, 249.6 degrees. In addition, as shown in FIG. 11, the extending length of the oblique surface 142a along the axial direction A (indicated in FIG. 1) is, for example, 1 mm, and the extending length of the second stop portion 142d along the axial direction A (indicated in FIG. 1) is, for example, 1 mm. In other embodiments, the linking component 142 may have other appropriate design parameters, the disclosure is not limited thereto.

The assembling method of some components of the hinge module 100 in the aforementioned embodiment is described as followings. FIG. 12 is a flow chart of an assembling method of the axle set, the linking component, and the column body in FIG. 1. Firstly, an axle set 150 is passed through a linking component 142, wherein the linking component 142 has a slot 142c (Step S602). Next, a column body 150a is attached on the axle set 150 through the slot 142c, so that the column body 150a is located in the slot 142c (Step S604). Wherein, the column body 150a is connected to the first axle 152 of the axle set 150, as an example.

In summary, with respect to the hinge module of the present embodiment, in process of increasing the included angle between the first motion component (connected to a docking station, for example) and the second motion component (connected to an electronic device, for example) from the first angle to the second angle, the second motion component props against the linking component by the push portion, such that the third motion component (connected to the foot stand, for example) is driven to rotate relative to the first motion component so as to flip over. Hence, the foot stand connected to the third motion component supports the docking station and the electronic device. When the included angle between the first motion component and the second motion component reaches the second angle, the linking component is stopped by the first stop portion of the first motion component, so the third motion component is not driven by the second motion component. At this time, the second motion component can continue to flip over relative to the first motion component so that the included angle between the first motion component and the second motion component continues increasing. Accordingly, the tilt angle of the second motion component and the electronic device connected to the same can be freely and independently adjusted between the second angle and the third angle and is not limited by the third motion component and the foot stand connected to the same.

Although the disclosure has been disclosed with reference to the aforesaid embodiments, they are not intended to limit the disclosure. It will be apparent to one of ordinary skill in the art that modifications and variations to the described embodiments may be made without departing from the spirit and the scope of the disclosure. Accordingly, the scope of the disclosure will be defined by the attached claims and not by the above detailed descriptions.

What is claimed is:

1. A hinge module, comprising:
   a first motion component, a second motion component, and a third motion component, the second motion component having a push portion;
   a linking assembly, comprising a linking component; and
   an axle set, comprising a first axle, a second axle and a transmission assembly, wherein the second axle is pivotally inserted into the first axle, such that the first axle and the second axle are coaxial and respectively connected to the linking component and the third motion component, the first axle and the second axle are rotatably connected to each other, the transmission assembly is inserted pivotally to the first axle and the second axle, and the first motion component and the second motion component are inserted and pivotally mounted to the axle set, and
   wherein when the second motion component rotates relative to the first motion component with a first angular velocity from a first operation state toward a second operation state so as to increase an included angle between the first motion component and the second motion component, the second motion component props against the linking component by the push portion, such that the linking component drives the third motion component, through the transmission assembly, to concurrently rotate relative to the first motion component with a second angular velocity by the axle set,
   wherein when the second motion component is in the first operation state, the included angle between the first motion component and the second motion component is a first angle, when the second motion component is in the second operation state, the included angle between the first motion component and the second motion component is a second angle, and the second angle is larger than the first angle.

2. The hinge module as recited in claim 1, wherein the first motion component has a first stop portion, when the second motion component rotates to the second operation state, the first stop portion blocks the linking component to stop the linking component from continuing to rotate.

3. The hinge module as recited in claim 1, wherein the linking assembly comprises an elastic member, the elastic member is connected between the linking component and the axle set, when the second motion component continues to rotate relative to the first motion component from the second operation state, the second motion component resists elastic force of the elastic member and pushes the linking component to move along the axle set by the push portion, and the second motion component rotates toward a third operation state to increase the included angle between the first motion component and the second motion component, when the second motion component is in the third operation state, the included angle between the first motion component and the second motion component is a third angle, and the third angle is larger than the second angle.

4. The hinge module as recited in claim 3, wherein when the included angle between the first motion component and the second motion component is the first angle, an included angle between the first motion component and the third motion component is the same as the included angle between the first motion component and the second motion component.

5. The hinge module as recited in claim 3, wherein when the included angle between the first motion component and the second motion component is the second angle, an included angle between the first motion component and third motion component is the third angle.

6. The hinge module as recited in claim 1, wherein the linking component has a slot, the axle set has a column body, the column body passes through the slot, and the axle set is driven by the linking component through the column body.

7. The hinge module as recited in claim 6, wherein the linking component is slidably disposed on the axle set along an axial direction of the axle set, and the column body is adapted to move in the slot along the axial direction of the axle set.

8. The hinge module as recited in claim 1, wherein the transmission assembly is a planetary gear set comprising an internal gear, a planetary carrier, and a plurality of planetary gears, the internal gear is connected with the first motion component, the planetary carrier is connected with the first axle, the plurality of planetary gears are connected with the planetary carrier and engaged between the internal gear and the second axle.

9. The hinge module as recited in claim 1, wherein the linking component has an oblique surface, when the second motion component rotates relative to the first motion component from the first operation state to the second operation state, the second motion component props against the oblique surface of the linking component by the push portion, and when the second motion component continues to rotate relative to the first motion component from the second operation state, the push portion moves along the oblique surface.

10. The hinge module as recited in claim 9, wherein a tilt angle of the oblique surface with respect to an axial direction of the axle set is 45 degrees.

11. The hinge module as recited in claim 1, wherein the second axle is inserted into the first axle.

12. The hinge module as recited in claim 1, wherein the linking component has a second stop portion, when the second motion component rotates relative to the first motion component to a third operation state to increase the included angle between the first motion component and the second motion component, the push portion leans against the second stop portion to stop the second motion component from continuing to rotate relative to the first motion component, when the second motion component is in the third operation state, the included angle between the first motion component and the second motion component is a third angle, and the third angle is larger than the second angle.

13. A hinge module, comprising:
a first motion component, a second motion component, and a third motion component, the second motion component having a pull portion;
a linking assembly, comprising a linking component; and
an axle set, comprising a first axle, a second axle and a transmission assembly, wherein the second axle is pivotally inserted into the first axle, such that the first axle and the second axle are coaxial and respectively connected to the linking component and the third motion component, the first axle and the second axle are rotatably connected to each other, the transmission assembly is inserted pivotally to the first axle and the second axle, and the first motion component and the second motion component are inserted and pivotally mounted to the axle set;
wherein when the second motion component rotates relative to the first motion component with a first angular velocity from a second operation state toward a first operation state so as to decrease an included angle between the first motion component and the second motion component, the second motion component props against the linking component by the pull portion, so as to drive the third motion component, through the transmission assembly, to concurrently rotate relative to the first motion component with a second angular velocity by the linking component,
wherein when the second motion component is in the first operation state, the included angle between the first motion component and the second motion component is a first angle, when the second motion component is in the second operation state, the included angle between the first motion component and the second motion component is a second angle, and the second angle is larger than the first angle.

14. The hinge module as recited in claim 13, wherein the second motion component is adapted to rotate relative to the first motion component from a third operation state, to increase the included angle between the first motion component and the second motion component, toward the second operation state, so that the pull portion is in contact with the linking component, when the second motion component is in the third operation state, the included angle between the first motion component and the second motion component is a third angle, and the third angle is larger than the second angle.

15. The hinge module as recited in claim 14, wherein when the included angle between the first motion component and the second motion component is the first angle, an included angle between the first motion component and the third motion component the same as the included angle between the first motion component and the second motion component.

16. The hinge module as recited in claim 14, wherein when the included angle between the first motion component and the second motion component is the second angle, an included angle between the first motion component and third motion component is the third angle.

17. The hinge module as recited in claim 13, wherein the linking component has a slot, the axle set has a column body, the column body passes through the slot, and the axle set is driven by the linking component through the column body.

18. The hinge module as recited in claim 13, wherein the transmission assembly is a planetary gear set comprising an internal gear, a planetary carrier, and a plurality of planetary gears, the internal gear is connected with the first motion component, the planetary carrier is connected with the first axle, the plurality of planetary gears are connected with the planetary carrier and engaged between the internal gear and the second axle.

19. The hinge module as recited in claim 13, wherein the second axle is inserted into the first axle.

20. A hinge module, comprising:
a first motion component, a second motion component, and a third motion component, the second motion component having a push portion and a pull portion;
a linking assembly, comprising a linking component; and
an axle set, comprising a first axle, a second axle and a transmission assembly, wherein the second axle is pivotally inserted into the first axle, such that the first axle and the second axle are coaxial and respectively connected to the linking component and the third motion component, the first axle and the second axle are rotatably connected to each other, the transmission assembly is inserted pivotally to the first axle and the second axle, and the first motion component and the second motion component are inserted and pivotally mounted to the axle set,
wherein when the second motion component rotates relative to the first motion component with a first angular velocity from a first operation state toward a second operation state so as to increase an included angle between the first motion component and the second motion component, the second motion component props against the linking component by the push portion, such that the linking component drives the third motion component, through the transmission assembly, to concurrently rotate relative to the first motion component with a second angular velocity by the axle set, and wherein when the second motion component rotates relative to the first motion component with the first angular velocity from the second operation state toward the first operation state so as to decrease the included angle between the first motion component and the second motion component, the second motion component props against the linking component by the pull portion, so as to drive the third motion component, through the transmission assembly, to concurrently rotate relative to the first motion component with the second angular velocity by the linking component, wherein when the second motion component is in the first operation state, the included angle between the first motion component and the second motion component is a first angle, when the second motion component is in the second operation state, the included angle between the first motion component and the second motion component is a second angle, and the second angle is larger than the first angle.

21. The hinge module as recited in claim 20, wherein the first motion component has a first stop portion, when the second motion component rotates to the second operation state, the first stop portion blocks the linking component to stop the linking component from continuing to rotate.

22. The hinge module as recited in claim 20, wherein the linking assembly comprises an elastic member, the elastic member is connected between the linking component and the axle set, when the second motion component continues to rotate relative to the first motion component from the second operation state, the second motion component resists elastic force of the elastic member and pushes the linking component to move along the axle set by the push portion, and the second motion component rotates toward a third operation state to increase the included angle between the first motion component and the second motion component, when the second motion component is in the third operation state, the included angle between the first motion component and the second motion component is a third angle, and the third angle is larger than the second angle, and wherein the second motion component is adapted to rotate relative to the first motion component from the third operation state toward the second operation state, so that the pull portion is in contact with the linking component.

23. The hinge module as recited in claim 22, wherein when the included angle between the first motion component and the second motion component is the first angle, an included angle between the first motion component and the third motion component the same as the included angle between the first motion component and the second motion component.

24. The hinge module as recited in claim 22, wherein when the included angle between the first motion component and the second motion component is the second angle, an included angle between the first motion component and third motion component is the third angle.

25. The hinge module as recited in claim 20, wherein the linking component has a slot, the axle set has a column body, the column body passes through the slot, and the axle set is driven by the linking component through the column body.

26. The hinge module as recited in claim 25, wherein the linking component is slidably disposed on the axle set along an axial direction of the axle set, and the column body is adapted to move in the slot along the axial direction of the axle set.

27. The hinge module as recited in claim 20, wherein the transmission assembly is a planetary gear set comprising an internal gear, a planetary carrier, and a plurality of planetary gears, the internal gear is connected with the first motion component, the planetary carrier is connected with the first axle, the plurality of planetary gears are connected with the planetary carrier and engaged between the internal gear and the second axle.

28. The hinge module as recited in claim 20, wherein the linking component has an oblique surface, when the second motion component rotates relative to the first motion component from the first operation state to the second operation state, the second motion component props against the oblique surface of the linking component by the push portion, and when the second motion component continues to rotate relative to the first motion component from the second operation state, the push portion moves along the oblique surface.

29. The hinge module as recited in claim 28, wherein a tilt angle of the oblique surface with respect to an axial direction of the axle set is 45 degrees.

30. The hinge module as recited in claim 20, wherein the second axle is inserted into the first axle.

31. The hinge module as recited in claim 20, wherein the linking component has a second stop portion, when the second motion component rotates relative to the first motion component to a third operation state to increase the included angle between the first motion component and the second motion component, the push portion leans against the second stop portion to stop the second motion component from continuing to rotate relative to the first motion component, when the second motion component is in the third operation state, the included angle between the first motion component and the second motion component is a third angle, and the third angle is larger than the second angle.

* * * * *